(12) United States Patent
Heindl et al.

(10) Patent No.: US 11,150,937 B2
(45) Date of Patent: Oct. 19, 2021

(54) EDGE DEVICE AND METHOD FOR OPERATING AN EDGE DEVICE

(71) Applicant: SIEMENS AKTIENGESELLSCHAFT, Munich (DE)

(72) Inventors: Elisabeth Heindl, Cadolzburg (DE); Igor Milovanovic, Nuremberg (DE); Wolfgang Riedl, Nuremberg (DE); Benjamin Kohler, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/624,458

(22) PCT Filed: Jun. 4, 2018

(86) PCT No.: PCT/EP2018/064558
§ 371 (c)(1),
(2) Date: Dec. 19, 2019

(87) PCT Pub. No.: WO2018/234020
PCT Pub. Date: Dec. 27, 2018

(65) Prior Publication Data
US 2020/0183726 A1 Jun. 11, 2020

(30) Foreign Application Priority Data
Jun. 19, 2017 (EP) .................................... 17176590

(51) Int. Cl.
*G06F 13/00* (2006.01)
*G06F 9/455* (2018.01)
(Continued)

(52) U.S. Cl.
CPC ...... *G06F 9/45558* (2013.01); *H04L 63/0272* (2013.01); *H04L 63/0823* (2013.01);
(Continued)

(58) Field of Classification Search
CPC ............ H04L 63/0272; H04L 63/0823; H04L 63/102; H04L 67/34; H04L 63/0281;
(Continued)

(56) References Cited

U.S. PATENT DOCUMENTS 8,514,868 B2 * 8/2013 Hill ......................... G06F 9/541
370/401
8,713,633 B2 * 4/2014 Thomas ................ H04L 63/102
726/2
(Continued)

FOREIGN PATENT DOCUMENTS

WO   WO2009155574 A1   12/2009
WO   WO2016186755 A1   11/2016

OTHER PUBLICATIONS

European Search Report for European Patent Application No. 17176590.2-1870 dated Oct. 18, 2017.
(Continued)

*Primary Examiner* — Kenneth R Coulter
(74) *Attorney, Agent, or Firm* — Lempia Summerfield Katz LLC

(57) ABSTRACT

The invention relates to an edge device (10) and to a method for operating an edge device (10), wherein the edge device (10) is supplemented by a unikernel manager (52) and a base unikernel (54), wherein the unikernel manager (52) acts as a means at least for starting and stopping a unikernel (40-46) installed on the edge device (10), and wherein the base unikernel (54), in the form of a standalone unikernel, comprises the base functionality of the edge device (10).

10 Claims, 3 Drawing Sheets

(51) Int. Cl.
*H04L 29/06* (2006.01)
*H04L 29/08* (2006.01)

(52) U.S. Cl.
CPC ............ *H04L 63/102* (2013.01); *H04L 67/34* (2013.01); *G06F 2009/45562* (2013.01); *G06F 2009/45587* (2013.01)

(58) Field of Classification Search
CPC ....... G06F 9/45558; G06F 2009/45562; G06F 2009/45587; G06F 2221/2149; G06F 2221/2153; G06F 21/53; H04W 12/00403; H04W 12/00
USPC ....... 709/250, 249, 227–229, 225, 230, 223, 709/224; 726/3–15
See application file for complete search history.

(56) References Cited

U.S. PATENT DOCUMENTS

| | | | |
|---|---|---|---|
| 8,813,174 B1 | 8/2014 | Koeten | |
| 9,886,303 B2* | 2/2018 | Koller Jemio | G06F 8/41 |
| 10,169,028 B2* | 1/2019 | Htay | G06F 8/65 |
| 10,362,517 B2* | 7/2019 | Crawford | H04L 67/1065 |
| 10,547,456 B1* | 1/2020 | Liljenstolpe | H04L 9/30 |
| 10,674,411 B2* | 6/2020 | Crawford | H04W 36/0083 |
| 10,945,166 B2* | 3/2021 | Crawford | H04W 36/00835 |
| 2010/0027552 A1* | 2/2010 | Hill | G06F 21/53 |
| | | | 370/401 |
| 2014/0020072 A1 | 1/2014 | Thomas | |
| 2016/0344736 A1* | 11/2016 | Khait | G06F 21/335 |
| 2017/0364377 A1* | 12/2017 | Koller Jemio | G06F 9/45533 |
| 2018/0165110 A1* | 6/2018 | Htay | G06F 8/65 |
| 2018/0375897 A1* | 12/2018 | Kawasaki | H04L 63/1491 |
| 2020/0127852 A1* | 4/2020 | Liljenstolpe | H04L 9/006 |
| 2020/0260349 A1* | 8/2020 | Crawford | G06F 16/27 |

OTHER PUBLICATIONS

PCT International Search Report and Written Opinion of International Searching Authority dated Jul. 11, 2018 corresponding to PCT International Application No. PCT/EP2018/064558 filed Jun. 4, 2018.

* cited by examiner

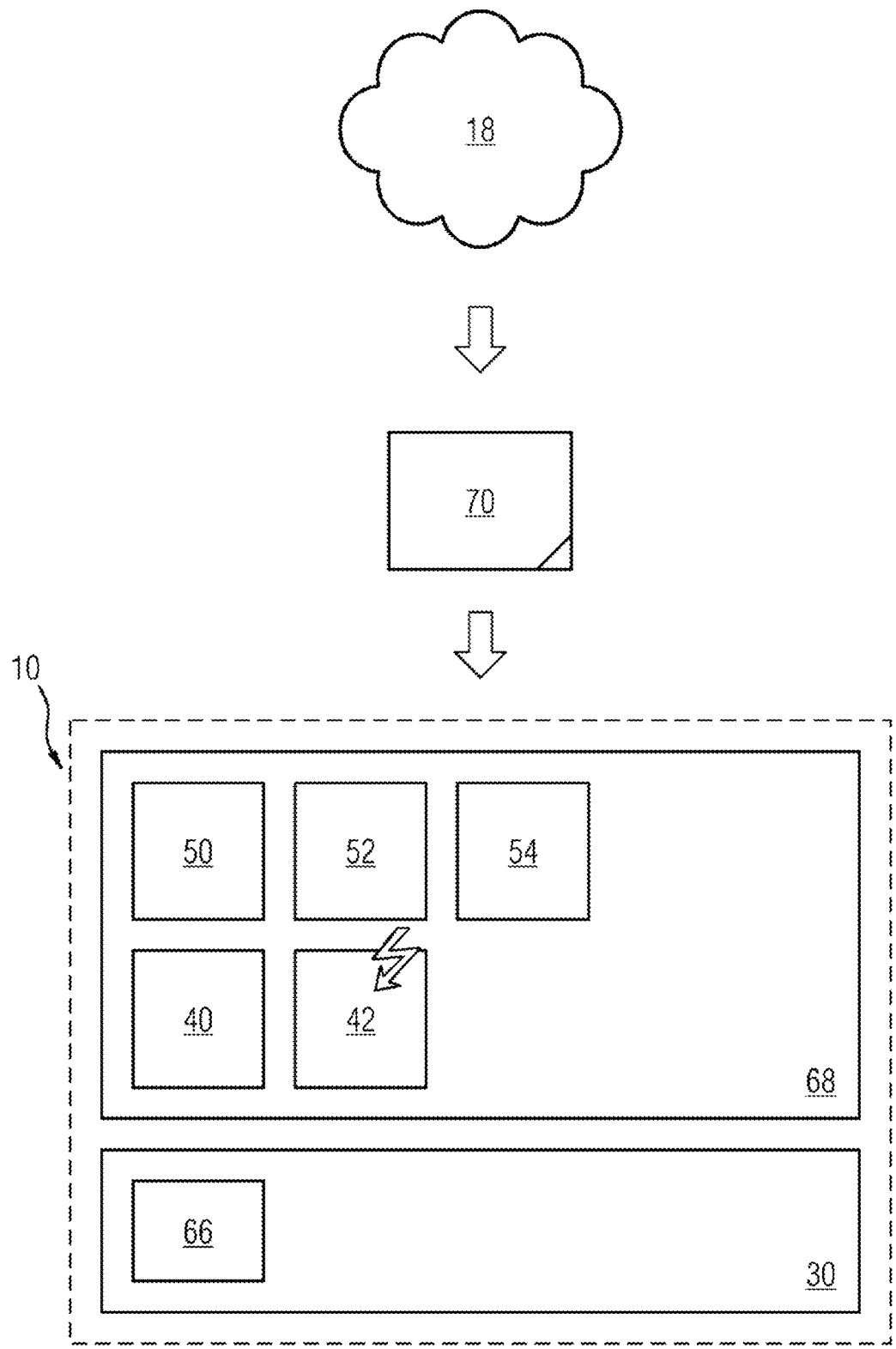

EDGE DEVICE AND METHOD FOR OPERATING AN EDGE DEVICE

This application is the National Stage of International Application No. PCT/EP2018/064558, filed Jun. 4, 2018, which claims the benefit of European Patent Application No. EP17176590.2, filed Jun. 19, 2017. The entire contents of these documents are hereby incorporated herein by reference.

BACKGROUND

The present embodiments relate to an edge device and to a method for operating an edge device.

Edge devices are fundamentally known per se and are often also referred to as edge gateways. An edge device acts as an interface between two computer networks (e.g., between a first computer network, by which automation devices intended to control and/or monitor a technical process are communicatively connected to one another on a so field level, and a second network, such as the cloud). Any device belonging to the respective first computer network may fundamentally interchange data with a device in the respective second computer network by the edge device (e.g., may store data produced in the course of controlling and/or monitoring the technical process in the cloud or the like).

With the emergence of Internet of Things (IoT), cloud platforms (e.g., Siemens MindSphere, Microsoft Azure IoT, Amazon AWS IoT, etc.), and the associated edge devices, the complexity of the system architectures in the industrial environment is increasing. The connectivity of the conventional field level and the edge devices there (e.g., edge gateways) to public cloud platforms results in new challenges with regard to security. Modern edge devices are often equipped with a universal operating system (e.g., Linux, Windows etc.) having a comprehensive range of functions and services. Software is natively installed thereon. In order to protect these devices from attacks, an attempt is made to "harden" the system software (e.g., the entirety of the respective operating system and the gateway software referred to as the basic functionality below) by deactivating services or components that are not required. However, even in the case of deactivation, such generic services or components are still available in the operating system kernel, from which a potentially relatively large area of attack results.

By now, it is often necessary for an edge device to not only undertake precisely one dedicated function, but rather to provide a plurality of functionalities in a parallel manner. For example, an edge device may provide the connectivity of the field level of an automation solution to the cloud and may offer an application that makes it possible to preprocess data from the field level. In order to dynamically install such functionalities or similar functionalities and the respective necessary application on an edge device or a plurality of edge devices (e.g., deployment), the container technology has become established. It is a standard method for easily packaging and distributing (e.g., "deploying") applications on a target device or a group of target devices, and there are various implementations. In the Linux environment, the open-source software "docker", for example, has gained acceptance as container technology. An application that is packaged and deployed as a container includes, in addition to each respective application, a complete runtime environment (e.g., libraries and/or binary and configuration files) that is needed to execute the respective application(s). Differences in the various operating system distributions are abstracted by the packaging of at least one application and the respective runtime environment in a software container, which is referred to as containerization below. The resulting software containers are side-by-side-capable (e.g., the applications encapsulated therein may be executed alongside one another and independently of one another). However, a peculiarity of container technology is that all software containers share a common operating system kernel. Although individual software containers may be separated by appropriate network virtualization, the individual software containers are all on a common generic kernel (see FIG. 1) that offers a broad area of attack with regard to security gaps that are present under certain circumstances.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the potential ability to attack an edge device and in the process to achieve the flexibility provided within the scope of container technology is reduced.

An edge device is intended and configured, in a manner known fundamentally per se, to act as an interface, for example, between automation devices that are communicatively connected to one another and are intended to control and/or monitor a technical process, and at least one external or further network. According to one or more of the present embodiments, unikernel technology is used, instead of the previously used container technology, for encapsulating a software application to be executed on the edge device, and the edge device includes additional functional units implemented in software for this purpose. A first additional functional unit is referred to as a unikernel manager below. A second additional functional unit is referred to as a basic unikernel below. The unikernel manager acts as a way for at least starting and stopping a unikernel installed on the edge device and is accordingly intended and configured to start or stop a unikernel installed on the edge device, as necessary, during operation of the edge device. The basic unikernel includes, in the form of an independent unikernel, the basic functionality of the edge device (e.g., functionality that allows the edge device to act as an interface between networked automation devices, and a further network).

In a method for operating such an edge device, a unikernel installed on the edge device is started or stopped as necessary and automatically by the unikernel manager, and the basic functionality of the edge device is undertaken by the basic unikernel.

The advantage of the present embodiments is that each application to be executed by the edge device is encapsulated in a unikernel in a manner that is particularly favorable from security considerations. In addition, with regard to the encapsulation of one or more applications, a unikernel provides the same advantages as a software container. Specifically, unikernels are likewise side-by-side-capable, with the result that the applications encapsulated therein may also be executed here alongside one another and independently of one another on the edge device.

The reduced approach of unikernel technology benefits the security of the edge device and of the overall system in which the edge device performs an interface function. Many services of a traditional kernel are not included in each unikernel installed on the edge device and monitored by the unikernel manager (e.g., starting, stopping, etc.) or are at least considerably reduced. The resulting decreasing number of components (e.g., services that run on an edge device) consequently considerably reduces the ability to attack the edge device. In addition, unikernels may be isolated up to the level of the hypervisor (e.g., Xen hypervisor), whereas, in conventional software containers, the isolation includes only the kernel as the lowermost level. By virtue of the fact that a unikernel may be started (e.g., booted, started up) or stopped (e.g., terminated, shut down), the functionality of an edge device of the type proposed here may be dynamically adapted. In this respect, an additional functionality may be added, for example, by starting a further unikernel and the at least one application encapsulated therein, and/or a functionality that is no longer required may be deactivated by stopping the respective unikernel. In the case of a security gap that becomes known during operation of the edge device, only each unikernel affected by the security gap is to be deactivated, while all other unikernels may continue to run on the edge device without losses of function. In the case of an edge device that uses a conventional operating system or container technologies, the complete edge device would have to be deactivated or the kernel would have to be patched, for example.

Any reference in the description to aspects of dependent claims should be read expressly as a description of optional features even without a specific indication. The edge device proposed here may also be developed according to the dependent method claims, for example, by virtue of the edge device including corresponding devices that are intended and configured to carry out the respective method acts, and vice versa.

In one embodiment of the edge device and a method for operating the the edge device, an identifier identifying a compromised unikernel may be received by the basic unikernel and is received by the basic unikernel, and each unikernel identified by the received identifier may be stopped by the unikernel manager and is stopped by the basic unikernel. Functions that make it possible to attack the edge device may therefore be switched off in a simple manner. When a compromised unikernel is stopped, the the compromised unikernel is no longer visible from the outside, and there is no ability to attack.

Therefore, one or more, or some or all applications and/or the basic function, for example, of the edge device may be implemented as a unikernel. A unikernel may by directly compiling an application together with one or more libraries (e.g., from a library operating system (LibOS) that contains drivers/libraries of operating system services) that contain the specific operating system services (e.g., only these operating system services) required by the application. A unikernel may be implemented such that the unikernel is executed directly on hardware, directly on a hypervisor (e.g., reference is sometimes made to the fact that the unikernel is executed in a virtual LibOS machine) or in a software container. Embodiments may include one or more unikernels and/or virtual machines that run directly on a hypervisor.

A unikernel may therefore be understood as being a single-purpose program. A unikernel may be compiled, for example, from a modular stack including application code, system libraries, and/or configurations.

In another embodiment of the edge device and a method for operating the the edge device, a unikernel held in a unikernel depot remote from the edge device but reachable by the edge device may be downloaded from the unikernel depot and installed on the edge device by the basic unikernel, and is downloaded as necessary during operation of the edge device and is installed on the edge device. In this manner, the functionality of the edge device may be dynamically expanded with the functionality of the at least one application encapsulated in the respective unikernel by installing at least one further unikernel. Likewise, instead of a compromised and deactivated unikernel, it is possible to load and install a debugged unikernel that replaces the compromised unikernel, with the result that the functionality of the edge device is retained.

In one embodiment of the edge device and a method for operating the edge device, an electronic signature of a unikernel held in the unikernel depot or downloaded from the unikernel depot may be checked by the basic unikernel and is checked during operation. This provides that a manipulated unikernel may be detected, and the manipulation is detected in connection with the downloading. If manipulation is detected, provision may be made, for example, for the affected unikernel to not be downloaded from the unikernel depot at all, not be installed on the edge device, or at least not be readily started.

In an additional or alternative embodiment of the edge device and a method for operating the edge device, a unikernel that has been downloaded from the unikernel depot may be decrypted by the basic unikernel, for example, using a TPM chip included in hardware of the edge device, and is decrypted during operation in connection with the downloading. This provides that sensitive data possibly contained in the unikernel may not be viewed by third parties.

The unikernel manager and the basic unikernel are implemented in the form of a computer program and are loaded into a memory of the edge device during operation of the edge device. One or more of the present embodiments are therefore also a computer program that acts as a unikernel manager and/or as a basic unikernel and has program code instructions that may be executed by a computer, and a storage medium having such a computer program (e.g., a computer program product with program code), and also an edge device, into the memory of which such a computer program is loaded or may be loaded as a way for carrying out the method and corresponding configurations.

If method acts or sequences of method acts are described below, this relates to actions that are carried out on the basis of the computer program or under the control of the computer program, unless it is expressly pointed out that individual actions are prompted by a user of the computer program. Any use of the term "automatic" at least provides that the relevant action is carried out based on the computer program or under the control of the computer program.

Instead of a computer program with individual program code instructions, the method described here and below may also be implemented in the form of firmware. It is clear to a person skilled in the art that, instead of implementing a method in software, an implementation in firmware, in firmware and software, or in firmware and hardware is also possible. Therefore, in the description presented, the term software or the term computer program also includes other possible implementations (e.g., an implementation in firmware, in firmware and software, or in firmware and hardware).

An exemplary embodiment is explained in more detail below based on the drawings. Mutually corresponding objects or elements are provided with the same reference signs in all figures.

The exemplary embodiments should not be understood as restricting the invention. Rather, additions and modifications are also entirely possible within the scope of the present disclosure. For example, additions and modifications may be gathered by a person skilled in the art with regard to achieving the object, such as by combining or modifying individual features or method acts described in connection with the general or specific part of the description and contained in the claims and/or the drawing, and which result in new subject matter or in new method acts or sequences of method acts by virtue of combinable features.

BRIEF DESCRIPTION OF THE DRAWINGS

FIG. 3 shows a further illustration of the edge device of FIG. 2 and an identifier.

DETAILED DESCRIPTION

Figure 1:
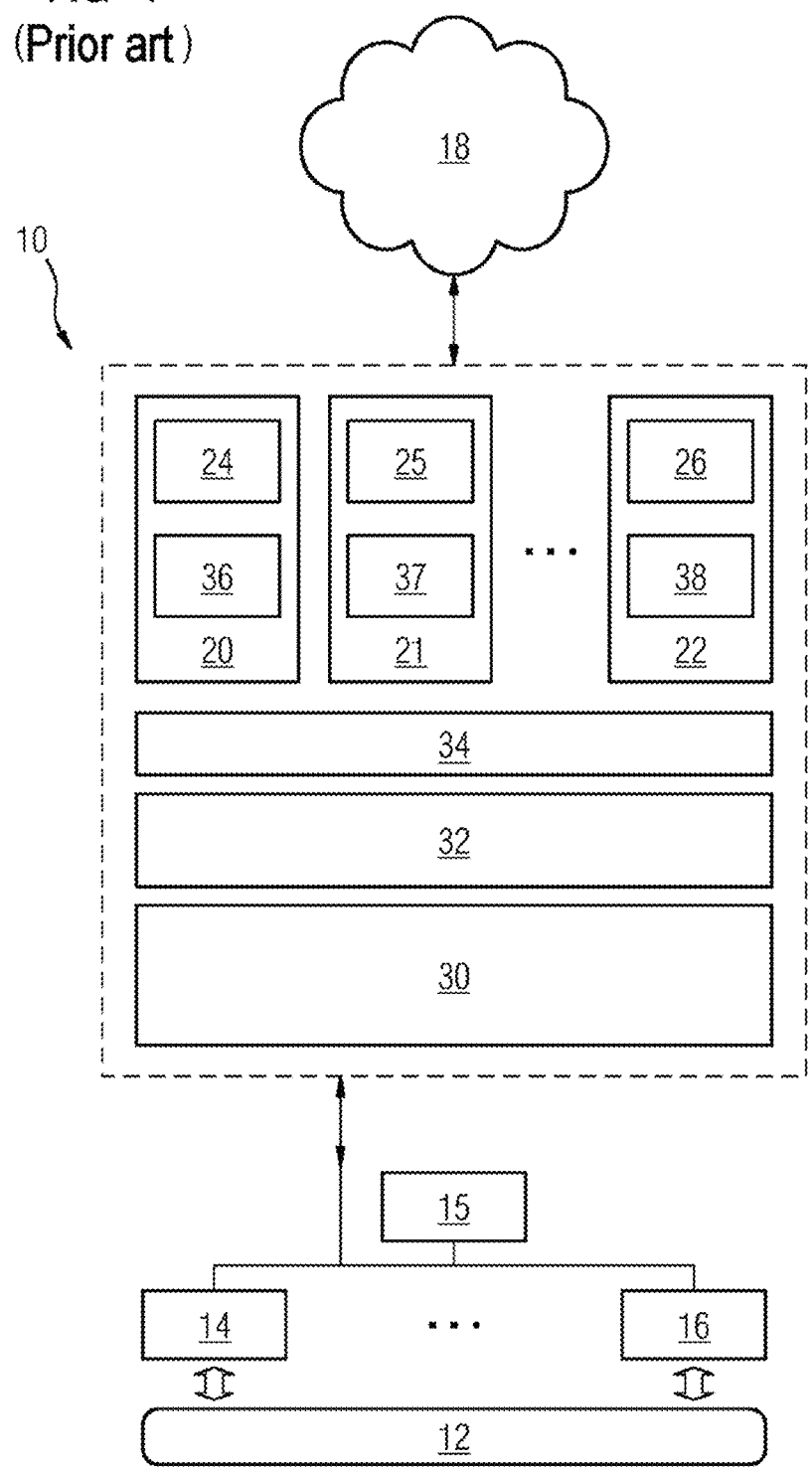
FIG. 1 shows an edge device.

The illustration in FIG. 1 shows, in a schematically simplified manner, one embodiment of an edge device 10 (e.g., an edge gateway) that is sometimes also referred to as a device for short below. The edge device 10 has an operating system on hardware of the edge device 10 and a container engine that is on the operating system and is intended to execute at least one software application encapsulated in a container on the edge device 10.

According to the scenario shown by way of example, the edge device 10 acts, in a manner fundamentally known way, as an interface between automation devices 14, 15, 16 that are communicatively connected to one another and are intended to control and/or monitor a technical process 12 (not shown in any more detail) and at least one external network (e.g., the cloud 18).

In the case of a known edge device 10 that is intended to execute applications 24, 25, 26 encapsulated in software containers 20, 21, 22, an operating system 32 is on respective hardware 30 of the device. A respective container engine (e.g., a docker engine) that acts as a container hypervisor 34 and allows the execution of at least one application 24-26 (e.g., a containerized application) encapsulated in a software container 20-22 in a manner fundamentally known is on the operating system. The respective software container 20-22 includes the runtime environment 36, 37, 38 needed to execute the application 24, 25, or 26 or each application 24-26 encapsulated in the container 20-22 (e.g., binary files, libraries, configuration files, etc.).

As shown in the simplified illustration in FIG. 1, an operating system 32 that is possibly reduced with regard to individual services or components is used as a basis for the container engine acting as the container hypervisor 34. An operating system 32 that is possibly reduced in this form is also still an operating system 32 with comprehensive kernel functionality.

Figure 2:
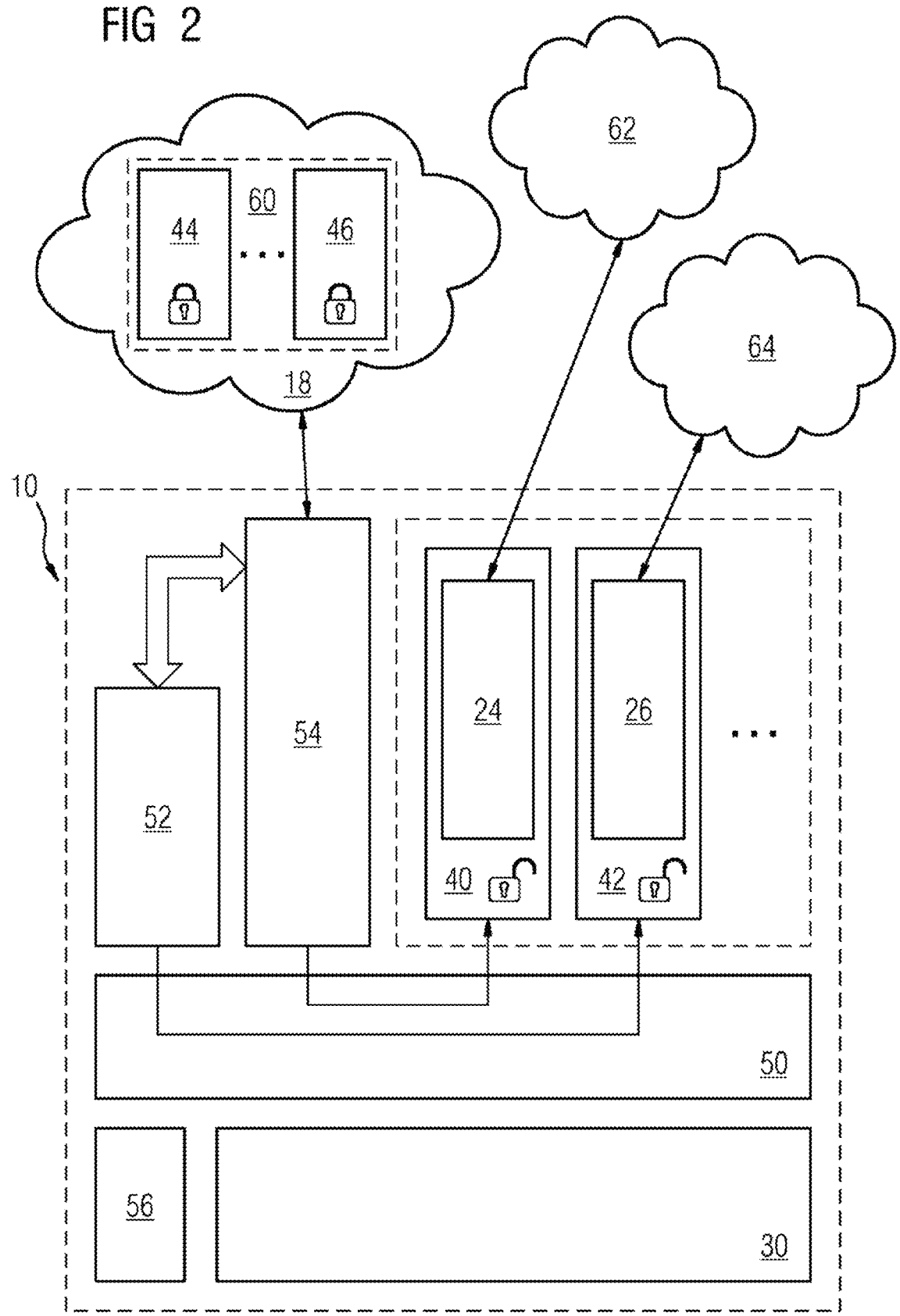
FIG. 2 shows one embodiment of an edge device.

Unikernel technology has become established in competition with an operating system 32 with comprehensive kernel functionality. Unikernel software stacks do not use a complete operating system kernel, but rather, provide precisely the operating system components that are required by a respective application. Unikernel technology is based on the library OS approach, according to which both the basic functionality (e.g., driver, network stack, file system, etc.) and the respective application 24-26 (FIG. 2) are themselves compiled into an independent image 40, 42, 44, 46 (e.g., see FIG. 2; unikernel image) that may be directly started on a unikernel hypervisor 50 (FIG. 2). This results in compact images 40, 42 (e.g., slim images) and makes it possible to quickly load or boot (e.g., a few milliseconds) the respective application 24-26. By integrating a unikernel hypervisor infrastructure on an edge device 10, it is therefore possible to boot and terminate unikernel images 40-46.

According to the approach proposed here, the edge device 10 is expanded with additional software components, and the illustration in FIG. 2 shows this in a schematically simplified manner. The additional software components are the already mentioned unikernel hypervisor 50 on the hardware 30 of the edge device 10, a unikernel manager 52, and a basic unikernel image 54. In the interests of better readability of the further description, a unikernel image is referred to as a unikernel for short below. Consequently, the basic unikernel image 54 is referred to as a basic unikernel 54.

The edge device 10 according to FIG. 2 also acts, for example, as an interface between automation devices 14-16 communicatively connected to one another, and at least one external or further network 18, as shown in the illustration in FIG. 1. The automation devices 14-16 communicatively connected by a bus system or the like and the technical process 12 controlled and/or monitored according to an automation solution are not shown again here. The technical process 12 and the networked automation devices 14-16 are sometimes referred to together as a field level for short below.

The unikernel manager 52 manages a unikernel 40-46 or a plurality of unikernels 40-46 (e.g., starts and stops one unikernel 40-46 in each case). According to the approach proposed, the unikernel manager 52 is optionally intended and configured to decrypt an encrypted unikernel 40-46 before the unikernel 40-46 is started. For this purpose, the unikernel 40-46 uses a private key that is situated, for example, on a trusted platform module (TPM) chip 56 of the respective edge device 10.

The basic unikernel 54 includes, in the form of an independent unikernel, the basic functionality of the edge device 10. The basic functionality of an edge device 10 that is fundamentally known per se includes, for example, the set-up of a point-to-point connection by Ethernet and/or ATM, assessment of a quality of a communication service (e.g., quality of service), handling and/or implementation of different data streams (e.g., multi-service, translation), routing, and the like.

Optionally, the basic unikernel 54 or a further basic unikernel 54 supplementing the basic unikernel 54 is intended and configured to act as an interface for communicating with at least one unikernel depot 60 (e.g., a unikernel hub). In this property, the basic unikernel 54 acts to download a unikernel 44, 46 from the unikernel depot 60 and install (e.g., deploy) the downloaded unikernel 44, 46 on the respective edge device 10.

The unikernel 44, 46 or each unikernel 44, 46 held in a unikernel depot 60 includes, as described above, the respective executable application 24-26 (e.g., complied application) encapsulated in the respective unikernel 44, 46, as well as library functions (e.g., in likewise compiled one) and the like. Before being added to the unikernel depot 60, each unikernel 44, 46 held in a unikernel depot 60 has been compiled on a local computer (not shown) and has been optionally digitally signed and/or encrypted and has then been transmitted to the unikernel depot 60. A memory that is possibly also distributed in the cloud 18 acts as the unikernel depot 60, for example.

In the case of a unikernel 40-46 signed in a manner fundamentally known per se (e.g., by CRC, RSA, SHA, etc.), the authenticity of the downloaded unikernel 40-46 may be ensured, before starting the unikernel 40-46, by automatically checking the digital signature using the basic unikernel 54; it may also be ensured that the unikernel 40-46 has not been manipulated. In the case of a digitally signed unikernel 40-46 and a check of the digital signature that is automatically carried out by the basic unikernel 54, the downloaded unikernel 40-46 is started by the basic unikernel 54 only when the check of the digital signature was able to be concluded without errors. If this is not the case, the downloaded unikernel 40-46 is not started and is optionally deleted from the memory of the edge device 10.

In the case of a unikernel 40-46 encrypted in a manner fundamentally known per se (e.g., by AES, RSA, SHA, etc.), the authenticity of the downloaded unikernel 40-46 may likewise be ensured before starting the unikernel 40-46 by decryption that is automatically carried out by the basic unikernel 54, and it may also be ensured that the unikernel 40-46 has not been manipulated. In the case of a digitally encrypted unikernel 40-46 and decryption that is automatically carried out by the basic unikernel 54, the downloaded unikernel 40-46 may be started by the basic unikernel 54 only when the decryption operation was able to be concluded without errors. If this is not the case, the downloaded unikernel 40-46 is not started and is optionally deleted from the memory of the edge device 10. In the case of an encrypted unikernel 40-46, it is also ensured that access data, for example, contained therein (e.g., access data for cloud endpoints) or certificates and the like have not been compromised and cannot be misused.

The illustration in FIG. 2 shows a situation with an edge device 10 having a first unikernel 40 and a second unikernel 42. Software applications that are intended to be executed on the edge device 10 are encapsulated in one or more unikernels. The execution of the respective unikernel is controlled and monitored by a unikernel manager, and the basic functionality of the edge device 10 is also encapsulated in a separate unikernel.

Both the first unikernel 40 and the second unikernel 42 have been downloaded from the unikernel depot 60 by the basic unikernel 54, for example. The first unikernel 40 includes, for example, an application 24 for communicating with a private cloud 62. In this respect, the application 24 encapsulated in the first unikernel 40 acts, for example, as an archive application and includes, for this purpose, in compiled form, the program code instructions that determine the function of the application 24 as well as library functions and the like that are possibly needed to execute the application 24 (e.g., library functions for accessing the respective hardware 30 of the edge device 10). Data from the field level of a respectively controlled and/or monitored technical process 12 that is not shown here (FIG. 1) are then archived, for example, by the first unikernel 40. The second unikernel 42 includes, for example, an application 26 for communicating with a MindSphere cloud 64. In this respect, the application 26 encapsulated in the second unikernel 42 is, for example, an application 26 for preprocessing, filtering, or the like for data coming from the field level of the technical process 12. The application 26 encapsulated in the second unikernel 42 otherwise likewise includes, in compiled form, the program code instructions that determine the function of the application 26, as well as library functions and the like that are possibly needed to execute the application 26 (e.g., library functions for accessing the respective hardware 30 of the edge device 10).

FIG. 3 shows a further illustration of the edge device 10 according to FIG. 2. According to this, the edge device 10 conventionally includes, as part of hardware 30, a processing unit 66 (e.g., a processor) in the form of or in the style of a microprocessor. The unikernel hypervisor 50, the unikernel manager 52, the basic unikernel 54, and the unikernel 40 or 42 or each unikernel 40, 42 installed on the edge device 10 and intended to be executed (e.g., unikernels 40-42 enabled for execution) are executed by the processing unit 66 during operation of the edge device 10. In this respect, the unikernel hypervisor 50, the unikernel manager 52, the basic unikernel 54, and the respective unikernel 40-42 are computer programs that may be executed independently of one another and may be loaded into a memory 68 of the edge device 10 in a manner fundamentally known per se and are loaded into this memory 68 during operation of the edge device 10.

If it emerges during operation of the edge device 10 that a unikernel 40-46 installed on the edge device 10 has been compromised (e.g., allows an attack in the form of unauthorized access to the edge device 10 or devices that may be reached via the edge device 10), the following is provided: if such a compromise has been detected, an identifier 70 identifying the affected unikernel 40-46 is transmitted to the edge device 10. The emission of the identifier 70 is carried out by a central entity (e.g., via the cloud 18) and is initiated, for example, by an expert of the provider of the edge device 10, an expert of the provider of the affected unikernel 40-46, or the like. On the part of the edge device 10, the basic unikernel 54 receives the identifier 70 identifying the compromised unikernel 40-46. The basic unikernel 54 internally transmits the received identifier 70 to the unikernel manager 52. The unikernel manager 52 stops the respective unikernel 40-46 identified by the received identifier 70 and previously executed by the edge device 10 (e.g., the unikernel 42 marked with the lightning symbol in the illustration in FIG. 3) on account of the received identifier 70. The ability to attack the edge device 10 on account of the compromised unikernel 42 is therefore immediately eliminated. The respective compromised unikernel 42 may optionally be deleted from the memory 68 of the edge device 10 by the unikernel manager 52. A unikernel 42 at least deactivated in this manner and possibly deleted from the memory 68 may be replaced, for example, by subsequently downloading a new, debugged unikernel 40-46 from the unikernel depot 60. The original functionality of the edge device 10 is then restored. In the meantime, the edge device 10 and any unikernel 40-46 not affected by the compromise may continue to run.

Even though the invention has been described and illustrated more specifically in detail by the exemplary embodiments, the invention is not restricted by the disclosed examples; other variations may be derived therefrom by a person skilled in the art without departing from the scope of protection of the invention.

Individual aspects in the foreground of the description filed here may therefore be summarized briefly as follows: the present embodiments specify an edge device 10 and a method for operating the edge device 10, where the edge device 10 has been supplemented with a software functionality that acts as a unikernel manager 52 and a software functionality that acts as a basic unikernel 54, each in the form of a computer program or a computer program module. The unikernel manager 52 acts as a way for at least starting and stopping a unikernel 40-46 installed on the edge device 10 and, during operation of the edge device 10, automatically starts or stops a unikernel 40-46 installed on the edge device 10 as necessary. The basic unikernel 54 includes, in the form of an independent unikernel, the basic functionality of the edge device 10 and is executed during operation of the edge device 10 so that the basic functionality of the edge device 10 is available (e.g., so that the edge device 10 may set up a communicative connection to another device in a manner fundamentally known per se). Such another device is, for example, a remote device in a remote further network or a device in the network to which the edge device 10 belongs. Within the scope of such a communicative connection, the edge device 10 may receive data from such a device or may transmit data to such a device in a manner likewise fundamentally known per se by the basic functionality.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An edge device that is configured to act as an interface between automation devices that are communicatively connected to one another and are configured to control, monitor, or control and monitor a technical process and at least one external network, the edge device comprising:
   a unikernel manager and a basic unikernel,
   wherein the unikernel manager is configured to start and stop a unikernel installed on the edge device,
   wherein the basic unikernel comprises, in the form of a separate unikernel independent of the unikernel manager and the unikernel installed on the edge device, basic functionality of the edge device; and
   wherein a second unikernel held in a unikernel depot remote from the edge device is downloadable from the unikernel depot and installable on the edge device by the basic unikernel.

2. The edge device of claim 1, wherein an identifier identifying a compromised unikernel is receivable by the basic unikernel, and
   wherein the unikernel manager is configured to stop the compromised unikernel identified by the received identifier.

3. The edge device of claim 1, wherein the basic unikernel is configured to check an electronic signature of the second unikernel held in the unikernel depot or downloaded from the unikernel depot.

4. The edge device of claim 1, wherein the basic unikernel is configured to decrypt the second unikernel that is downloadable from the unikernel depot.

5. The edge device of claim 4, wherein the basic unikernel is configured to decrypt the second unikernel that has been downloaded from the unikernel depot using a TPM chip included in hardware of the edge device.

6. The edge device of claim 1, further comprising:
   a processor; and
   a memory into which instructions are loaded, the instructions being executable by the processor during operation of the edge device.

7. A method for operating an edge device that is configured to act as an interface between automation devices that are communicatively connected to one another and are configured to control, monitor, or control and monitor a technical process and at least one external network, the edge device comprising a unikernel manager and a basic unikernel, wherein the unikernel manager is configured to start and stop a unikernel installed on the edge device, wherein the basic unikernel is a separate unikernel independent of the unikernel manager and the unikernel installed on the edge device, the method comprising:
   starting or stopping, by the unikernel manager, the unikernel installed on the edge device;
   downloading a second unikernel held in a unikernel depot remote from the edge device from the unikernel depot; and
   installing, by the basic unikernel, the downloaded second unikernel on the edge device,
   wherein basic functionality of the edge device is undertaken by the basic unikernel.

8. The method of claim 7, further comprising:
   receiving, by the basic unikernel, an identifier identifying a compromised unikernel;
   transmitting, by the basic unikernel, the received identifier to the unikernel manager; and
   stopping, by the unikernel manager, the compromised unikernel identified by the received identifier.

9. The method of claim 7, further comprising checking, by the basic unikernel, an electronic signature of the second unikernel held in the unikernel depot or downloadable from the unikernel depot, decrypting the second unikernel that has been downloaded from the unikernel depot, or a combination thereof.

10. In a non-transitory computer-readable storage medium that stores instructions executable by one or more processors as a unikernel manager or a basic unikernel on an edge device to operate the edge device, which is configured to act as an interface between automation devices that are communicatively connected to one another and are configured to control, monitor, or control and monitor a technical process and at least one external network, the edge device comprising the unikernel manager and the basic unikernel, wherein the unikernel manager is configured to start and stop a unikernel installed on the edge device, wherein the basic unikernel is a separate unikernel independent of the unikernel manager and the unikernel installed on the edge device, the instructions comprising:
   starting or stopping, by the unikernel manager, the unikernel installed on the edge device;
   downloading a second unikernel held in a unikernel depot remote from the edge device from the unikernel depot; and
   installing, by the basic unikernel, the downloaded second unikernel on the edge device,
   wherein basic functionality of the edge device is undertaken by the basic unikernel.

* * * * *